US011727812B2

(12) United States Patent
Cao et al.

(10) Patent No.: US 11,727,812 B2
(45) Date of Patent: Aug. 15, 2023

(54) AIRPLANE FLIGHT PATH PLANNING METHOD AND DEVICE BASED ON THE PIGEON-INSPIRED OPTIMIZATION

(71) Applicant: BEIHANG UNIVERSITY, Beijing (CN)

(72) Inventors: Xianbin Cao, Beijing (CN); Wenbo Du, Beijing (CN); Jintong Zhang, Beijing (CN); Haichao An, Beijing (CN); Yumeng Li, Beijing (CN); Xi Zhu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 280 days.

(21) Appl. No.: 17/033,785

(22) Filed: Sep. 26, 2020

(65) Prior Publication Data

US 2021/0020051 A1  Jan. 21, 2021

Related U.S. Application Data

(63) Continuation-in-part of application No. 16/048,206, filed on Jul. 27, 2018, now abandoned.

(30) Foreign Application Priority Data

Jul. 27, 2017  (CN) .......................... 201710625878.8

(51) Int. Cl.
*G08G 5/00* (2006.01)
*G08G 5/04* (2006.01)
(Continued)

(52) U.S. Cl.
CPC ............. *G08G 5/0034* (2013.01); *G06N 7/01* (2023.01); *G06Q 10/047* (2013.01);
(Continued)

(58) Field of Classification Search
CPC .. G08G 5/0034; G08G 5/0039; G08G 5/0069; G08G 5/045; G06N 7/005; G06N 5/003; G06Q 10/047
See application file for complete search history.

(56) References Cited

U.S. PATENT DOCUMENTS 6,266,610 B1 *  7/2001  Schultz ................ G06Q 10/047
701/533
7,447,593 B2 * 11/2008  Estkowski ............. G08G 1/164
700/250

(Continued)

FOREIGN PATENT DOCUMENTS

WO  WO-2017068224 A1 *  4/2017  ............ A01M 29/00
WO  WO-2021230948 A2 * 11/2021  ............ G08G 5/0069

OTHER PUBLICATIONS

Li et al, Target detection approach for UAVs via improved Pigeon-inspired Optimization and Edge Potential Function, Oct. 22, 2014, Elsevier Masson SAS, 9 pages (Year: 2014).*

(Continued)

*Primary Examiner* — Dale W Hilgendorf
(74) *Attorney, Agent, or Firm* — Locke Lord LLP; Tim Tingkang Xia, Esq.

(57) ABSTRACT

A computer-based airplane flight path planning method based on the pigeon-inspired optimization (PIO) algorithm includes steps of establishing an uncertainty prediction model, determining the path to be optimized, and obtaining an optimal path using the PIO algorithm for a flight controller onboard to execute. The PIO algorithm treats a pigeon flock as a scale-free network, applies map and compass operators to the scale-free network, and performs landmark operations to obtain the optimal path. The device that performs the path planning includes an access module for obtaining the regional environment information and a flight controller onboard the airplane. The flight controller (Continued)

includes a building module for setting up the trajectory prediction model including uncertainties; a determining module to determine the trajectories which need optimization; an optimization module, which uses the PIO algorithm to optimize the flight path; and a computer memory module.

8 Claims, 5 Drawing Sheets

(51) Int. Cl.
    *G06Q 10/047*      (2023.01)
    *G06N 7/01*      (2023.01)
    *G06N 5/01*      (2023.01)

(52) U.S. Cl.
    CPC .......... *G08G 5/0069* (2013.01); *G08G 5/045* (2013.01); *G06N 5/01* (2023.01); *G08G 5/0039* (2013.01)

(56) References Cited

U.S. PATENT DOCUMENTS

| | | | | |
|---|---|---|---|---|
| 9,824,593 | B1* | 11/2017 | Kronfeld | G08G 5/0091 |
| 10,860,115 | B1* | 12/2020 | Tran | B64D 47/08 |
| 2013/0080043 | A1* | 3/2013 | Ballin | G05D 1/0005 |
| | | | | 701/120 |
| 2014/0180914 | A1* | 6/2014 | Abhyanker | G05D 1/102 |
| | | | | 705/332 |
| 2015/0356875 | A1* | 12/2015 | Sane | G08G 5/0047 |
| | | | | 701/408 |
| 2017/0139411 | A1* | 5/2017 | Hartung | H04L 12/40 |
| 2017/0336806 | A1* | 11/2017 | Blanc-Paques | G08G 5/045 |
| 2019/0035286 | A1* | 1/2019 | Cao | G08G 5/0039 |
| 2021/0089055 | A1* | 3/2021 | Tran | G06N 3/0445 |

OTHER PUBLICATIONS

Goel, Pigeon Optimization Algorithm: A Novel Approach for Solving Optimization Problems, 2014, IEEE, 5 pages (Year: 2014).*

Zhoa et al, Pigeon-inspired optimization applied to constrained gliding trajectories, Jul. 24, 2015, Springer Science and Business Media, 15 pages (Year: 2015).*

Zhang et al, Three-Dimensional Path Planning for Unihabited Combat Aerial Vehicle Based on Predator-Prey Pigeon-Inspired Optimization in Dynamic Environment, Feb. 2017, IEEE, 11 pages (Year: 2017).*

Zhang et al, Pigeon-Inspired Optimization Approach to Multiple UAVs Formation Reconfiguration Controller Design, Aug. 10, 2014, IEEE, 6 pages (Year: 2014).*

Duan, Target Detection and Mission Planning Based on Pigeon-Inspired Optimization, Dec. 29, 2015, 20 pages (Year: 2015).*

Hao et al., "Multiple UAVs Mission Assignment Based on Modified Pigeon-Inspired Optimization Algorithm", Proceedings of 2014 IEEE Chinese Guidance, Navigation and Control Conference, Aug. 8-10, 2014.

* cited by examiner

AIRPLANE FLIGHT PATH PLANNING METHOD AND DEVICE BASED ON THE PIGEON-INSPIRED OPTIMIZATION

CROSS REFERENCE TO RELATED APPLICATIONS

This application is a continuation-in-part of U.S. application Ser. No. 16/048,206 filed Jul. 27, 2018, which claims priority of China Patent Application No. 201710625878.8 filed Jul. 27, 2017. The entirety of each of the said applications is incorporated herein by reference.

BACKGROUND OF THE INVENTION

Technical Field

The invention relates to airplane flight path planning and to multiple attribute decision making technology. More specifically, the invention relates to a flight path planning method and device based on the pigeon-inspired optimization method.

Description of the Related Art

Path planning is the process of determining a collision-free pathway between the current position of an unmanned aerial vehicle ("UAV") and its destination. Researchers have been studying how to generate collision-free paths for vehicles in obstacle environments, which is critical for autonomous vehicles.

According to certain evaluation standard systems, path planning is: within a given planning space, finding the optimal and feasible flight path of the body movement from the starting point to the target point while satisfying certain constraint conditions and a certain performance index such that the movement of body safely accomplishes a predetermined task. Due to the movement of the aircraft, airplane flight path planning is complex under the complicated environment of the task. The path planning system needs to comprehensively consider the aircraft maneuverability, task time and terrain factors such as environment and enemy control area. Mathematically speaking, the aim of path planning is to find the optimal solution under many constraints.

The multi-objective optimization problem (MOP) brings multiple conflicting objectives. The essential difference between MOP and a single objective optimization problem is that in most cases of MOP, the improvement of an objective may negatively influence other objectives. Achieving the best performance of all the multiple objectives at the same time is impossible, as the optimum can only be achieved by proper coordination and compromising between the objective functions as far as possible.

The present existing aircraft flight path planning technology does not consider uncertainty conditions, such as wind, angle change, starting and end points of the operation, etc., resulting in a poor stability of the path planning procedure. Also, the UAV may deviate from the pre-planned path due to the error of the sensor on it and the inertia of its own motion. With a slight deviation, the pre-planned path might not be easily adapted. The UAV may need to replan its path from its current position to the destination, and path replanning could lead to unnecessary time consumption. Therefore, it is necessary for flight path planning to take uncertain conditions into consideration.

Pigeon-inspired optimization ("PIO") algorithm was first proposed by Prof. Duan Haibin in 2014. The PIO algorithm, compared to other bionic intelligent optimization algorithms, possesses parallelism in searching process, feasibility and characteristics of strong robustness, so it can be used to solve complex optimization problems in succession.

PIO is a novel swarm intelligence optimizer for solving global optimization problems. It is based on the natural behavior of pigeons. The migration of pigeons is described with two mathematical models. One is a map and compass operator, and the other one is a landmark operator. In the first half of the algorithm calculation, the map and compass operator is utilized, whereas the landmark operator is used in the second half. The switch of these operators is used to simulate the process of pigeon navigation. When pigeons are far from their destination, they use the earth magnetic field to adjust the direction. The magnetic field can be abstracted as map and compass operator. As they fly towards their destination, they rely more on landmarks along the way, which are abstracted as landmark operator.

Since the discovery of small-world phenomenon by Watts and Strogatz and scale-free property by Baraba'si and Albert a decade ago, it has been realized that most real networks are neither fully connected networks nor homogeneous regular networks, but of small-world and scale-free topological characteristics. In this disclosure, the pigeon-inspired optimization algorithm considers the topological characteristics. The movement of pigeons in the optimization process can be regarded as a dynamic network. Much evidence has demonstrated that the structural properties play key roles in dynamical processes taking place on complex networks. Previous findings prompt us to wonder how scale-free topology that captures the interaction pattern among pigeons affects the PIO and if scale-free topology can offer better performance of the optimization process. To answer these questions, the present invention has incorporated scale-free topology into the pigeon-inspired optimization in an attempt to improve the optimization process with respect to its solution quality and convergence efficiency. We have found that the scale-free topology that captures the diversity of individuals leads to the balance between the solution quality and the convergence efficiency, which outperforms the traditional pigeon-inspired optimization algorithm based on either fully-connected graph or regular graph.

BRIEF SUMMARY OF THE INVENTION

The purpose of the present invention is to provide a flight path planning method and device based on an intelligent optimization algorithm, especially considering the uncertainties of the route optimization problem. Compared with the ordinary path planning algorithm, the present invention takes into account the influence of the uncertainties so as to achieve higher path stability.

Note that the following description applies to airplanes in general, including but not limited to UAVs. When the term "UAV" is used in the description, it is only intended as an example and not a limitation.

Firstly, given the regional environment information provided by an airborne sensor, a trajectory prediction model generates the initial path using a traditional path planning algorithm. Secondly, an uncertainty prediction model is established. Thirdly, an initial path including uncertainty is determined, which is set as a preliminary solution to be optimized. Finally, by using a path optimization algorithm, an optimal path is obtained and executed by a flight controller onboard.

The steps of establishing the uncertainty prediction model are described in the following section.

Suppose there are K number of points that can change the course angle between the starting point and destination point within a specific area, the changes of course angle are expressed as $\theta_1, \theta_2, \ldots, \theta_K$, then the whole flight path or flight trajectory consists of K+1 path sections, with their lengths defined as $d_0, d_1, \ldots, d_K$, so the aircraft trajectory path function is described by:

$$f_L = \left(\sum_{k=0}^{K} d_k\right)^2$$

Once the changes of course angle and the lengths of path sections are calculated, N path points $(p_1, p_2, \ldots, p_n)$ are determined, with $p_1$, $p_n$ being the starting and destination points respectively of the flight path. In terms of quantity, n=K+2.

As shown in FIG. 2, each path point has an elliptical convex hull ("ellipse") describing the position uncertainty of the aircraft. With m threat centers (i.e. obstacles) within the region, the cost $f_{TA}$ of the aircraft's flight path caused by the threat centers is defined as $$f_{TA} = \sum_{i=1}^{n} \sum_{j=1}^{m} \frac{1}{(r_{ij}/r_{safe})^2}$$

where $r_{ij}$ represents the shortest distance between a path point ellipse and the threat center j and $r_{safe}$ denotes the safe distance of the threat center.

The fitness function is described as follows: min $f_{cost} = wf_L + (1-w)f_{TA}$ where w is a weight coefficient.

The constraint conditions are as follows: the value of each course angle change $\theta_1, \theta_2, \ldots, \theta_{K-1}$ has a set range; each path length has a minimum step size L and a set upper limit; $d_0, d_1, \ldots, d_{K-1}, \theta_1, \theta_2, \ldots, \theta_{K-1}$ cannot be 0; $r_{ij} \geq r_{safe}$ According to the established trajectory prediction model, an optimal path is obtained by using an intelligent optimization algorithm, followed by the output $d_0, d_1, \ldots, d_{K-1}, \theta_1, \theta_2, \ldots, \theta_{K-1}$.

The present invention provides an aircraft track planning device, which, as shown in FIG. 7, includes:

(a) an access module for getting the regional environment information;

(b) a building module having one or more building blocks for setting up a trajectory prediction model and an uncertainty prediction model;

(c) a determining module, which utilizes the trajectory prediction model and the uncertainty prediction model to determine the trajectories to be optimized;

(d) an optimization module, which uses the improved pigeon-inspired optimization algorithm to optimize the trajectories; and (e) a storage module for storing the parameters of the optimal path.

In (a), the function of the access module is established with the help of sensors, including a GPS device and infrared sensors. The location of start point, end point, and the airplane's or UAV's current position are provided by GPS. The infrared sensors can help the airplane or UAV locate threats or obstacles along the way.

In (b), (c), (d) and (e), the calculation and storage can be performed by the flight controller onboard, which is known as the brain of UAV The advantages of the invention are the ability to consider uncertainties during route optimization procedures and to improve path robustness and feasibility.

Combining scale-free network and the PIO algorithm is also an innovative feature of the present invention, which helps the optimization algorithm converge faster and escape from local optima. To sum up, compared with the traditional PIO algorithm, the efficiency and quality of path planning have been improved.

In the PIO algorithm, pigeons can be seen as nodes in the network, and pigeon population represents the network size. The much better performance of the invention is attributed to the cooperation between hub nodes and non-hub nodes in the network, where the former is of strong ability to ensure high solution quality and guides the evolution direction, while the latter helps maintain the activity of the population for exploring the solution space and escaping from local optima. The invention suggests the paramount importance of exploiting the diversity in population for achieving better evolution pattern of pigeons, which has many implications in computational intelligence and controlling a variety of dynamical processes. The invention proposes a method, in which scale-free network that incorporates the diversity of individuals is exploited to better mimic the real situation and improve the traditional PIO.

DETAILED DESCRIPTION OF THE PREFERRED EMBODIMENTS

The invention will now be further described using the accompanying drawings and examples.

According to the uncertainty prediction model, the prediction of the next flight moves takes different sources of uncertainty into account, such as wind, course angle change, operation starting and end points, sensor error, motion inertia, etc. Afterwards, an improved pigeon-inspired optimization ("PIO") algorithm is used to generate an optimal path.

Figure 1:
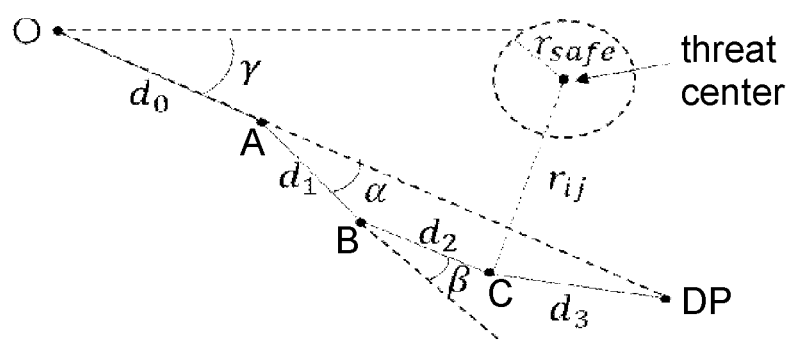
FIG. 1 is a schematic diagram of a track operation for changing course angles to avoid threats.

In this invention, an uncertainty prediction model is established, which improves path robustness and feasibility. To better illustrate this model, an example is given below. Suppose the initial path points and course angle changes are as shown in FIG. 1, the first step of the flight operation changes the course angle by an angle $\alpha$ while the distance parameter $d_0$ has a distance uncertainty $\epsilon_0$ which means that the plane may be in a range of $\pm\epsilon_0$ from $d_0$ to start the operation. Furthermore, the parameter $\epsilon_\alpha$ represents an uncertainty of the flight path course angle change $\alpha$. During the second step, the flight path is changed by the angle $\beta$ after traveling the distance $d_1$ with flight path course angle change and distance uncertainties $\epsilon_\beta$, $\epsilon_1$. After flying the distance of $d_2$ with existing distance uncertainty $\epsilon_2$, the flight path course angle is changed again in order to fly towards the destination point DP.

As seen in FIG. 1, 0 marks the starting point, DP the destination point, while A, B, and C show the positions of the course angle changes. The coordinates of the starting point are $(x_0, y_0)$ and the coordinates of the destination point are $(x_4, y_4)$. The remaining coordinates of the course angle changes at A, B, and C are $(x_1, y_1)$, $(x_2, y_2)$ and $(x_3, y_3)$, respectively. The course angle changes at point A and point B are $\alpha$ and $\beta$, respectively.

The variables $d_0$, $d_1$, $d_2$, $a$, with their corresponding uncertainty parameters $\epsilon_0$, $\epsilon_1$, $\epsilon_2$, $\epsilon_\alpha$, $\epsilon_\beta$ have the upper limit of $d_{0max}$, $d_{1max}$, $d_{2max}$, $\alpha_{max}$, $\beta_{max}$, respectively. The shortest distance from the starting point O to the destination point DP is defined as $d_{min}$. With m threat centers within the region, the aircraft's flight path points are represented by $p_0$, $p_1$, ..., $p_n$, $p_{n+1}$, with $p_0$, $p_{n+1}$ being the starting and destination points respectively of the aircraft's flight path. Each path point has an elliptical convex hull describing the position uncertainty of the aircraft.

The following section covers the process of obtaining the equation which describes the uncertainty prediction model:

Utilizing the coordinates of the starting and end points yields $$\left(\frac{y_4 - y_0}{x_4 - x_0}\right)(x - x_0) = y - y_0,$$

and the slope of line OD is $$k_1 = \frac{y_4 - y_0}{x_4 - x_0} = \tan\gamma.$$

The coordinates of point A $(x_1, y_1)$ are given by $$\left(\frac{d_0}{\sqrt{k_1^2 + 1}} + x_0, k_1(x_1 - x_0) + y_0\right),$$

and the slope of line AB is $k_2 = \tan(\alpha + \gamma)$.

The coordinates of point B $(x_2, y_2)$ are given by $$\left(\frac{d_1}{\sqrt{k_2^2 + 1}} + x_1, k_2(x_2 - x_1) + y_1\right),$$

and the slope of line BC is $k_3 = \tan(\alpha + \beta + \gamma)$.

The coordinates of point C $(x_3, y_3)$ are given by $$\left(\frac{d_2}{\sqrt{k_3^2 + 1}} + x_2, k_3(x_3 - x_2) + y_2\right).$$

The distance $d_3$ between point C and the destination point is given by $d_3 = \sqrt{(x_4 - x_3)^2 + (y_4 - y_3)^2}$.

The aircraft trajectory path function $f_L$ and the cost $f_{TA}$ of the aircraft's flight path caused by the threat centers are defined as $$f_L = (d_0 + d_1 + d_2 + d_3)^2;$$

$$f_{TA} = \sum_{i=1}^{n} \sum_{j=1}^{m} \frac{1}{(r_{ij}/r_{safe})^2}$$

According to these four functions, we build a fitness function:

$$\min f_{cost} = w f_L + (1-w) f_{TA}$$

Constraint conditions are as follows:

$-\alpha_{max} \leq \alpha \leq \alpha_{max}$;

$$\alpha_{max} = \frac{\pi}{6};$$

$-\beta_{max} \leq \beta \leq \beta_{max}$;

$$\beta_{max} = \frac{\pi}{6};$$

$L \leq d_0 \leq d_{0max}$, $L \leq d_1 \leq d_{1max}$, $L \leq d_2 \leq d_{2max}$;

$d_0$, $d_1$, $d_2$, $\alpha$, $\beta$ all are nonzero;

$r_{ij} \geq r_{safe}$;

The weight coefficient w ranges from 0 to 1 and the minimum step size L changes the flight route around a corner using the shortest way possible.

Figure 2:
FIG. 2 illustrates a track diagram taking uncertainty into consideration.

As shown in FIG. 2, each flight path point has an elliptical convex hull describing the position uncertainty of the aircraft. Taking the uncertainty into consideration helps improve the fault tolerance rate of the UAV when moving in accordance with the pre-planned path, which means higher path stability.

Figure 3:
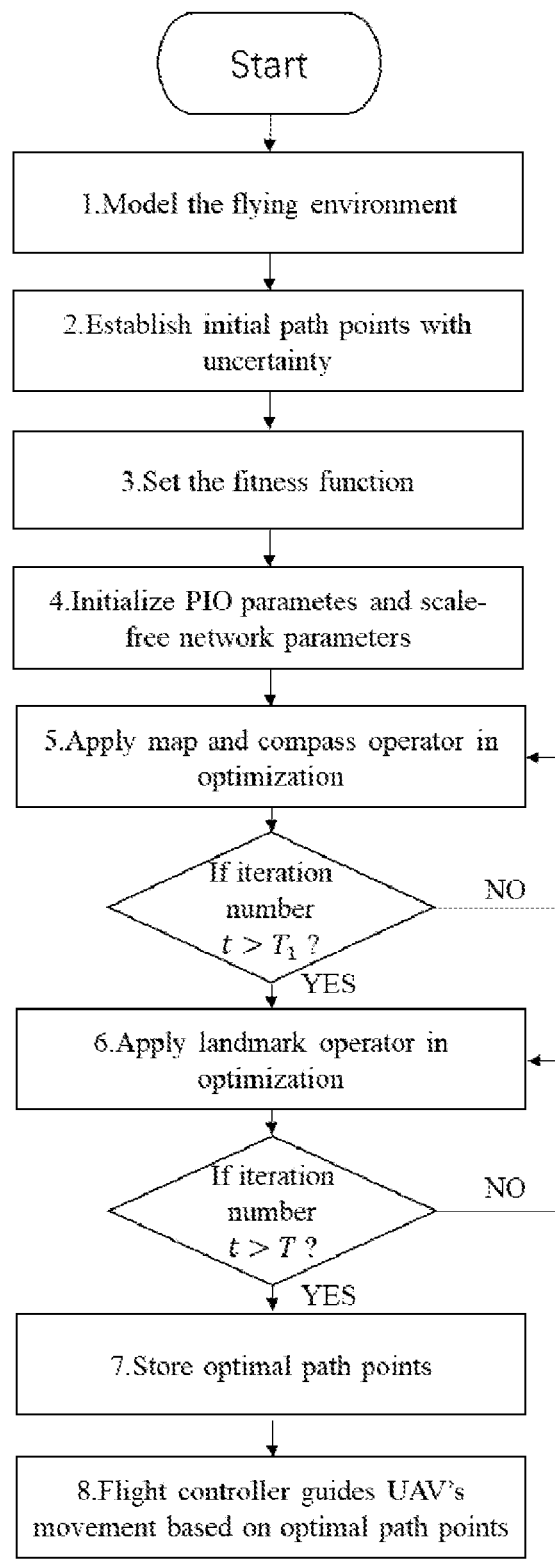
FIG. 3 shows the implementation steps of airplane flight path planning according to the present invention.

The method for planning a flight path of an aircraft based on the pigeon-inspired optimization algorithm of the present invention may include the steps as shown in FIG. 3 as follows:

Step 1: Given the environment information provided by sensors in the access module, model the flying environment of the UAV.

Step 2: Establish initial path points with the help of the trajectory prediction model and the uncertainty prediction model of the building module.

The trajectory prediction model utilizes Rapidly-exploring Random Trees algorithm (RRT) to generate a coarse path from the starting point O to the destination point DP. The benefit of RRT algorithm is its fast calculation speed and simple implementation. Path planning process includes two parts: path generation and path optimization. Using RRT algorithm in the generation part will save more time for optimization. Also, taking uncertainty into consideration helps improve path stability. Although the quality of the initial path is not good enough, it will be improved in the optimization part. The position information of initial path points is recorded by the storage module.

Step 3: set the fitness function for the position matrix (to be described in Step 4 below).

With the trajectory prediction model and the uncertainty prediction model, the present invention is to solve the minimization problem, for which the objective function is expressed as $$f(X) = \frac{1}{f_{min}(X) + \epsilon},$$

where $f_{min}(X)$ is the fitness function min $f_{cost}=wf_L+(1-w)f_{TA}$ and X stands for a particular path, and $\epsilon$ is a given small number to avoid the value of the denominator being zero.

Step 4: Initialize PIO algorithm parameters with the help of scale-free network.

In the initialization, the pigeon population $N_p$, the dimension D of the solution search space, the maximum number of iterations for map and compass operator $T_1$, the maximum number of iterations T, the geomagnetic factor R in the map and compass operator and landmark factor q are initialized. The dimension D of the solution search space includes the information about angle change and the distance of every path point.

Pigeon flock can be seen as a scale-free network because of its dynamically changing property. Introducing the characteristic of a scale-free network can make the optimization process converge faster. The size of the network is same as the pigeon population $N_p$. The size of the network is grown from 1 to $N_p$. A pigeon or a node represents a path solution. There are two main features of scale-free network: continuous growth and preference connection. The initial node at the beginning of network growth is set according to initial path points in the storage module. In the process of generating the network, new nodes follow the preference connection, which means that new nodes have a greater probability of connecting to nodes with a higher degree. $deg_j$ represents the degree of j-th node in the network. The degree of a node is the number of edges connected to the node.

Based on the scale-free network model, an $N_p \times D$ $N_p \times D$ initial position matrix and an $N_p \times D$ $N_p \times D$ initial velocity matrix are randomly generated. Every path solution is expressed as a row vector in the position matrix. Assume that there are K path points between the starting point O and the destination point DP, at which the course angle may change, the row vector can be expressed as $(d_0, d_1, \ldots, d_{K-1}, \theta_1, \theta_2, \ldots \theta_{K-1})$, where $(d_0, d_1, \ldots, d_{K-i})$ represents flying distance from one path point to the next path point except the destination point DP, and $(\theta_1, \theta_2, \ldots, \theta_{K-1})$ represents course angle changes of the UAV at each of the path points except the path point immediately preceding the destination point DP. With the information above, the path can be determined.

Step 5: apply map and compass operator to update the velocity and position of each pigeon in the velocity matrix and in the position matrix, respectively;

In the PIO model, virtual pigeons are used, with a total quantity of the virtual pigeons being used as $Q_p$, where $Q_p$. is a positive integer greater than 1. In the map and compass operator, the rules are defined with the position $X_iX_i$ and the velocity $V_iV_i$ of each pigeon i, where i is a variable indicating a designated number of each of the virtual pigeons, and i=1, 2, 3, . . . , $Q_p$. The velocity matrix and position matrix are updated in each iteration.

Firstly, use the fitness function to calculate the position matrix and find the node with minimum fitness value. This node is set as the central node. The degree of the central node is set as $deg_c$. $X_{self,i}$ denotes the position of i-th node with minimum fitness value in its iteration history. $X_{local,i}$ denotes the position with minimum fitness value among i-th node and its neighbor nodes.

When updating the position matrix and velocity matrix, it is necessary to compare the degree of i-th node $deg_i$ and the degree of the central node $deg_c$.

If $deg_i \geq deg_c$, the velocity of i-th node at t-th iteration is updated though the following equation:

$$V_i^t = V_i^{t-1} e^{-Rt} + r_1(X_{self,i}^t - X_i^{t-1})$$

If $deg_i < deg_c$, the velocity of i-th node at t-th iteration is updated though the following equation.

$$V_i^t = V_i^{t-1} e^{-Rt} + r_1(X_{local,i}^t - X_i^{t-1})$$

In the two equations above, R is the geomagnetic factor, $r_1$ is a random number ranging from 0 to 1, and $V_i^{t-1}$ is the velocity of i-th node at (t−1)-th iteration.

The central node is the current best position. In this minimization problem, all the nodes attempt to move close to the central node for lower fitness value. However, for those nodes with many connections, the more nodes connected, the greater the impact on the entire network when the change occurs. Therefore, these nodes need to make minor self-updates to avoid unnecessary oscillation in the network which may increase the optimization time.

Figure 4:
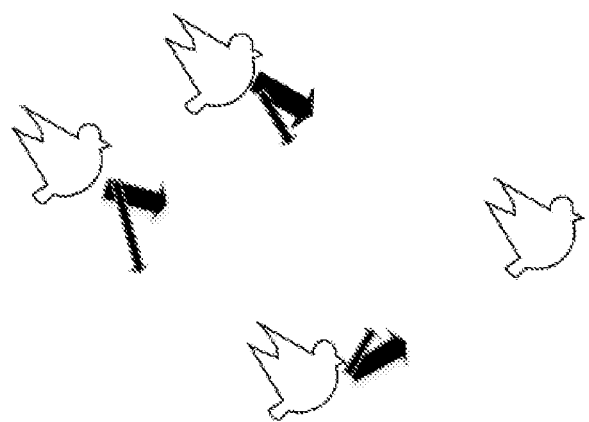
FIG. 4 illustrates the map and compass model of the PIO algorithm.

On the other hand, nodes with few connections can make updates much more straightforwardly. As shown in FIG. 4, the right-centered pigeon (the best position in the neighborhood), pointed by thick arrows from other pigeons, can be seen as a compass-direction which can lead the other pigeons directly to better orientations. Meanwhile, each pigeon has its own map-direction (the thin arrow), and the final direction for every single pigeon is the vector sum of the map-direction and compass-direction.

When we get the updated velocity, we can further update the position matrix, $$X_i^t = X_i^{t-1} + V_i^t$$

where $X_i^t$ and $V_i^t$ are the position and velocity of i-th node at t-th iteration, $X_i^{t-1}$ is the position of i-th node at (t−1)-th iteration.

If the current iteration number has not reached $T_1 T_1$, then continue Step 5. On the other hand, if the current iteration number has reached or exceeded $T_1$, then proceed to step 6.

Step 6: perform landmark operations, sort all pigeons according to fitness values, lower-adapted pigeons follow the adapted pigeons and find the center of the flock (destination), all pigeons will fly directly to their destination.

Figure 5:
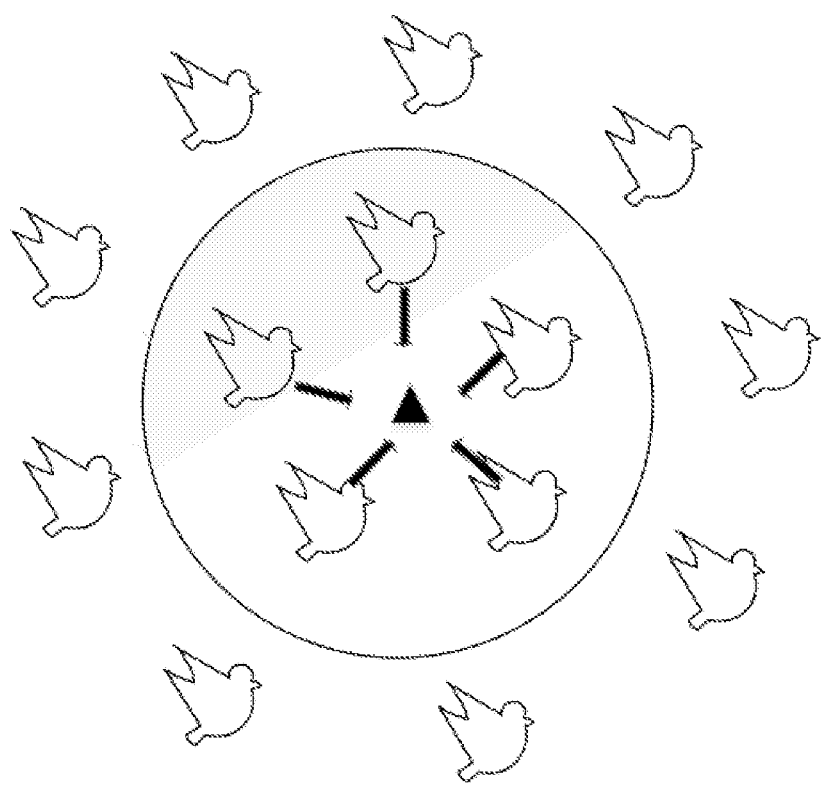
FIG. 5 illustrates the landmark model of the PIO algorithm.

Perform landmark operation when current iteration number t satisfies $T_1 < t \leq T$. In the landmark operation, the node with the smallest degree is deleted, that is, the row vectors corresponding to the node in the position matrix and the velocity matrix are set to zeros. As shown in FIG. 5, pigeons outside the circle are deleted after several iterations. Only pigeons in the circle are kept. However, the pigeons are still far from the destination point, and they are unfamiliar with the landmarks. Let $X_c^t$ be the center of the positions of the remaining pigeons in the position matrix and the velocity matrix at the t-th iteration, and suppose every remaining pigeon can fly straight to the destination point. The position updating rule for pigeon i at t-th iteration can be given by:

$$X_c^t = \frac{\Sigma_{N_p} X_i^t f(X_i^t)}{\Sigma_{N_p} f(X_i^t)}$$

$$X_i^t = X_i^{t-1} + r_2 q(X_c^t - X_i^{i-1})$$

where q is the landmark factor, $r_2$ is a random number ranging from 0 to 1, and fitness value is the quality of the individual pigeon. For the minimization problem, the objective function is expressed as $$f(X) = \frac{1}{f_{min}(X) + \epsilon},$$

where $\epsilon$ is a given small number to avoid the value of the denominator being zero.

Figure 6:
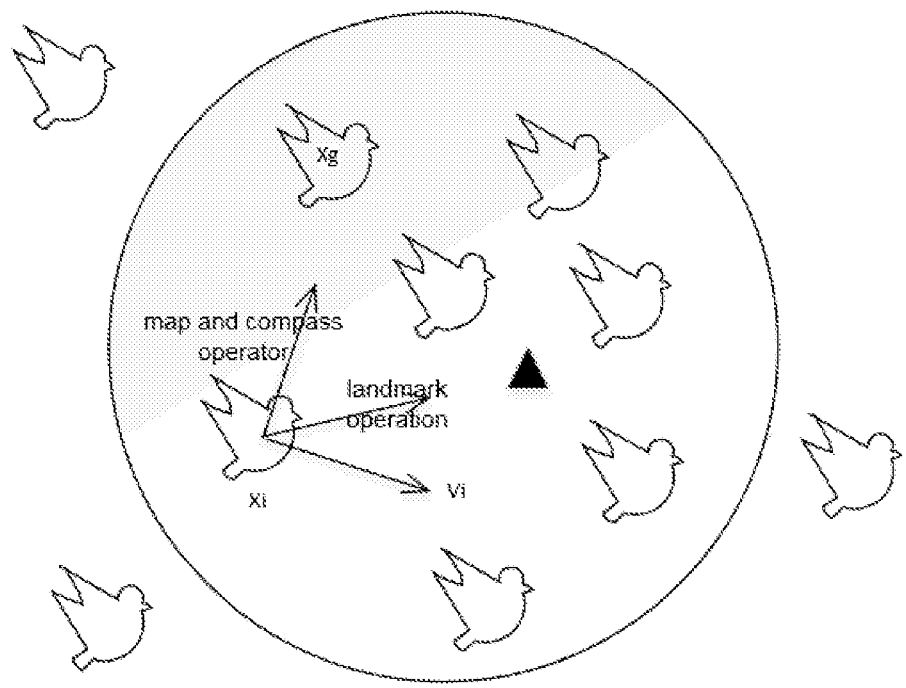
FIG. 6 illustrates the improved PIO algorithm.

As shown in FIG. 6, the improved PIO algorithm adopted by the present invention iterates to obtain the optimal path through the map and compass operation and landmark operation, and finally outputs the obtained various parameters of the optimal path.

If the iteration number has not reached $T_1T_1$, then repeat Step 6. On the other hand, if the iteration number has reached or exceeded $T_1$, then proceed to step 7.

Step 7: Determine whether the maximum number of iterations T is reached. If the iteration is finished, the row vector corresponding to the center node in the remaining nodes in the position matrix represents the final optimal planned path. And then record optimal path data in the storage module. Data includes distances between path points and course angle changes.

Step 8: Flight controller onboard guides the UAV to move according to planned path points.

Figure 7:
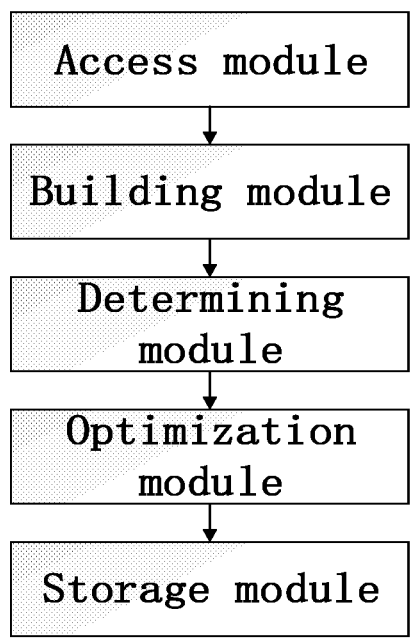
FIG. 7 shows a schematic diagram of the device for airplane flight path planning according to the present invention.

Correspondingly, the aircraft track planning device based on the pigeon-inspired optimization algorithm according to the present invention, as shown in FIG. 7, comprises an access module performing step 1, a building module performing steps 2-3, a determining module performing step 2, an optimizing module performing steps 4-7 and a storage module performing step 7. The following describes each module.

Figure 8:
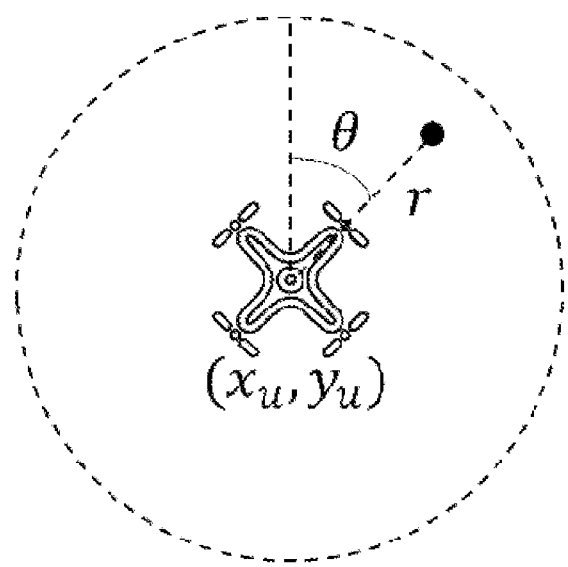
FIG. 8 illustrates a simplified block diagram of an airplane flight path planning system.

The access module is used to obtain the environment information in the specified area, mainly including the starting point and destination point in the specified area, the obstacle information, and the like. The function of the access module is established with the help of several hardware pieces, including a GPS device and infrared sensors. Using GPS, the location of the starting point and ending point is determined. The location of obstacles in the environment is provided by infrared sensors onboard. As seen in FIG. 8, the black dot represents the new obstacle, and the dotted circle represents the detection range of the infrared sensors onboard. r indicates the distance between the obstacle and the current position of the UAV. $\theta$ indicates the angle between the obstacle and the current course direction of the UAV. In FIG. 8, the current course direction of UAV is forward. Assuming the UAV is flying in a horizontal plane, the position of the UAV can be set as $(x_u, y_u)$. The position of the obstacle can be calculated as $(x_u + r \cos \theta, y_u + r \sin \theta)$. In this way, the location of obstacles in the environment is calculated. In the algorithm, an obstacle is considered as a threat center. Once a new threat center is detected, its location info is added into the geospatial data in the storage module. When the UAV encounters a new obstacle on its planned path, it needs to re-plan from its current location. As the geospatial data becomes more detailed, the number of re-planning for the UAV is reduced.

The building module contains trajectory prediction model and uncertainty prediction model. The process of building trajectory and calculating uncertainty is not repeated here.

The determining module is configured to determine an initial path to be optimized according to the environment information and models in the building module.

The optimization module is used for optimizing the path to be optimized by the improved pigeon-inspired optimization algorithm. The PIO algorithm with scale-free network, shown in FIGS. 4-6, is used to optimize the path to be optimized and obtain the optimal path.

The storage module is used to store the parameters of the optimal path in a computer memory. The parameters include flying distance from one path point to the next path point $d_0$, $d_1, \ldots, d_{K-1}$, and course angle changes of the UAV at each path point $\theta_1, \theta_2, \ldots, \theta_{K-1}$. In the process of path planning, parameters of initial path points generated by the determining module are stored, and also parameters for the optimal path points are stored for execution. Also, geospatial data including the location of the start point, the destination, and threat centers need to be stored in the storage module.

The calculation, storage, and UAV motion control in modules above is implemented on the flight controller, which can be seen as the brain of UAV. The flight controller contains two parts: Micro Controller Unit (MCU) and Inertia Measurement Unit (IMU). MCU provides storage space and computing software for optimized algorithm. In current days, MCU generally adopts STM32 series microprocessors with 32-bit ARM architecture. These microprocessors can sufficiently fulfill MCU's requirement for storage and computation. IMU is utilized to do motion tracking, which means sensing and recording the flight attitude and motion state. With the help of flight controller, the UAV can navigate safely and efficiently from the start to the destination.

What is claimed is:

1. A flight path planning method for an aircraft, comprising the steps of:
    (a) providing a computer-based system including a flight controller onboard the aircraft;
    (b) controlling, by the computer-based system, a GPS device and a plurality of infrared sensors to obtain regional environment information in a given specific area, including locations of a starting point, a destination point, and information about obstacles in the specific area;
    (c) establishing, by the flight controller, a trajectory prediction model and an uncertainty prediction model;
    (d) using the regional environment information, the trajectory prediction model and the uncertainty prediction model, determining, by the flight controller, an initial flight path within the specific area;
    (e) starting with the initial flight path determined in step (d), applying, by the flight controller, a pigeon-inspired optimization algorithm to obtain an optimal flight path within the specific area,
    (f) storing the optimal flight path in the computer memory;
    (g) controlling and guiding, by the flight controller, the aircraft to follow the optimal flight path,
    wherein the uncertainty prediction model in step (c) defines a fitness function for each given flight path as:

$$\min f_{cost} = wf_L + (1-w)f_{TA} \quad (I)$$

where

-continued $$f_L = \left(\sum_{k=0}^{K} d_k\right)^2,$$

where K is a quantity of points at which the aircraft may change course angle between the starting point and the destination point within the specific area, the corresponding course angle changes being $\theta_1, \theta_2, \ldots, \theta_K$ respectively, after a sequence of flight path sections with respective lengths $d_0, d_1, \ldots, d_K$;

$$f_{TA} = \sum_{i=1}^{n} \sum_{j=1}^{m} \frac{1}{(r_{ij}/r_{safe})^2},$$

where m is a quantity of threat centers corresponding to the obstacles within the specific area, n is a quantity of points along the aircraft's flight path represented by $(p_1, p_2, \ldots, p_n)$, with $p_1, p_n$ respectively corresponding to the starting point and the destination point of the flight path, wherein each of the points on the flight path has an elliptical convex hull (ellipse) describing a position uncertainty of the aircraft, $r_g$ represents a shortest distance between the ellipse of a point ($p_i$) and each of the threat centers (j), and $r_{ij} \geq r_{safe}$, $r_{safe}$ being a safe distance for the threat centers;

w is a weight coefficient from 0 to 1; and each of the course angle changes $\theta_1, \theta_2, \ldots, \theta_{K-1}$ is nonzero within a set range; each of the $d_0, d_1, \ldots, d_{K-1}$ is positive within a set range; and the pigeon-inspired optimization algorithm in step (e) is to minimize $$f(X) = \frac{1}{f_{min}(X) + \varepsilon}$$

wherein $f_{min}$ (X) is the fitness function in formula (I), $\varepsilon$ is a given small positive number, and X stands for a particular flight path to yield the values of $d_0$, $d_1, \ldots, d_{K-1}, \theta_1, \theta_2, \ldots, \theta_{K-1}$ for the optimal flight path;

wherein for the pigeon-inspired optimization algorithm in step (e), a virtual pigeon flock of a pigeon population is treated as a scale-free network with each virtual pigeon representing a flight path solution, the initial flight path obtained from step (d) is used to initialize the scale-free network, and a size of the scale-free network is grown from 1 to the pigeon population as the algorithm converges to the optimal flight path.

2. The flight path planning method as claimed in claim 1, wherein each of the course angle changes $\theta_1, \theta_2, \ldots, \theta_K$ is constrained between $-\pi/6$ and $\pi/6$; and each of $d_0, d_1, \ldots d_{K-1}$ has a same minimum step size (L).

3. The flight path planning method as claimed in claim 1, wherein the trajectory prediction model utilizes Rapidly-exploring Random Trees algorithm (RRT) to generate the initial flight path in step (d).

4. The flight path planning method as claimed in claim 1, wherein a position matrix and a velocity matrix, each with its number of rows equal to the pigeon population, are established and initialized; each flight path solution is expressed as a row vector in the position matrix; and the velocity matrix and the position matrix are updated iteratively by applying map and compass operator of the pigeon-inspired optimization algorithm.

5. The flight path planning method as claimed in claim 4, after applying the map and compass operator to update the velocity matrix and the position matrix, the pigeon-inspired optimization algorithm performs landmark operations iteratively to sort all virtual pigeons according to their fitness function values in order to find and update a center of the virtual pigeon flock, which eventually corresponds to the destination point.

6. The flight path planning method as claimed in claim 4, wherein the map and compass operator applied to update the position matrix and the velocity matrix in each iteration includes the steps of:

calculating the fitness function values for the position matrix and identifying a central node, which is defined as a node in the position matrix with a lowest value in the fitness function, a degree of the central node being $\deg_c$;

if the degree of an i-th node $\deg_i \geq \deg_c$, updating a velocity of the i-th node in the velocity matrix according to:

$$V_i^t = V_i^{t-1} e^{-Rt} + r_1(X_{self,i}^t - X_i^{t-1})$$

whereas if $\deg_i < \deg_c$, updating the velocity of the i-th node in the velocity matrix according to:

$$V_i^t = V_i^{t-1} e^{-Rt} + r_1(X_{local,i}^t - X_i^{t-1})$$

where $X_i^t$ and $V_i^t$ are respectively a position and the velocity of the i-th node in a current iteration, $X_i^{t-1}$ is the position of the i-th node in an immediately preceding iteration, $X_{self,i}$ denotes the position with minimum fitness function value of the i-th node in its iteration history, $X_{local,i}$ denotes the position with minimum fitness function value among the i-th node and its neighbor nodes, R is a geomagnetic factor, and $r_1$ is a random number from 0 to 1; and after the velocity matrix is updated, updating the position matrix according to:

$$X_i^t = X_i^{t-1} + V_i^t$$

7. The flight path planning method as claimed in claim 5, wherein the landmark operations in each iteration includes the steps of:

sorting all the virtual pigeons in the position matrix and the velocity matrix in order of the fitness function values;

deleting the node with the smallest degree by setting the row vectors corresponding to the node in the position matrix and the velocity matrix to zeros; and calculating a center of the remaining virtual pigeons for a current iteration, denoted by $X_c^t$, and then updating the position matrix according to:

$$X_c^t = \frac{\Sigma_{N_p} X_i^t f(X_i^t)}{\Sigma_{N_p} f(X_i^t)}$$

$$X_i^t = X_i^{t-1} + r_2 q(X_c^t - X_i^{t-1})$$

where $N_p$ is the pigeon population, where $X_i^t$ is a position of an i-th node in the current iteration, $X_i^{t-1}$ is the position of the i-th node in an immediately preceding iteration factor, $r_2$ is a random number from 0 to 1 and q is a landmark factor in the pigeon-inspired optimization algorithm.

8. The flight path planning method as claimed in claim 1, wherein the flight controller comprises a micro controller unit (MCU) and an inertia measurement unit (IMU), the MCU provides storage space and computing software for the pigeon-inspired optimization algorithm, and the IMU is designed to perform motion tracking tasks.

\* \* \* \* \*